United States Patent
Sakate et al.

(10) Patent No.: US 10,203,222 B2
(45) Date of Patent: Feb. 12, 2019

(54) METHOD FOR MANUFACTURING MAGNETIC ENCODER

(71) Applicant: UCHIYAMA MANUFACTURING CORP., Okayama-shi, Okayama (JP)

(72) Inventors: Kazushi Sakate, Tsuyama (JP); Tadashi Kasamoto, Kurashiki (JP); Tatsuo Katayama, Akaiwa (JP)

(73) Assignee: UCHIYAMA MANUFACTURING CORP., Okayama-shi, Okayama (JP)

( * ) Notice: Subject to any disclaimer, the term of this patent is extended or adjusted under 35 U.S.C. 154(b) by 199 days.

(21) Appl. No.: 15/311,379

(22) PCT Filed: May 18, 2015

(86) PCT No.: PCT/JP2015/064243
§ 371 (c)(1),
(2) Date: Nov. 15, 2016

(87) PCT Pub. No.: WO2015/174546
PCT Pub. Date: Nov. 19, 2015

(65) Prior Publication Data
US 2017/0082456 A1   Mar. 23, 2017

(30) Foreign Application Priority Data

May 16, 2014 (JP) ................. 2014-102827

(51) Int. Cl.
*G01D 5/14* (2006.01)
*H01F 7/02* (2006.01)
*B29C 35/02* (2006.01)
*B29C 45/00* (2006.01)
*B29K 19/00* (2006.01)
*G01D 5/245* (2006.01)
*H01F 1/117* (2006.01)
*H01F 41/02* (2006.01)
*B29K 105/16* (2006.01)
*B29K 509/00* (2006.01)

(52) U.S. Cl.
CPC .............. *G01D 5/14* (2013.01); *B29C 35/02* (2013.01); *B29C 45/0001* (2013.01); *G01D 5/245* (2013.01); *H01F 1/117* (2013.01); *H01F 7/0215* (2013.01); *H01F 41/0273* (2013.01); *B29K 2019/00* (2013.01); *B29K 2105/16* (2013.01); *B29K 2509/00* (2013.01); *B29K 2995/0008* (2013.01)

(58) Field of Classification Search
None
See application file for complete search history.

(56) References Cited

U.S. PATENT DOCUMENTS

| | | |
|---|---|---|
| 2002/0183427 A1 | 12/2002 | Yamaguchi |
| 2004/0220316 A1 | 11/2004 | Abe et al. |
| 2004/0227648 A1* | 11/2004 | Isobe ............. G01D 5/14 341/15 |
| 2006/0169943 A1* | 8/2006 | Yamaguchi ....... C08K 3/20 252/62.54 |
| 2006/0186369 A1 | 8/2006 | Kasamoto |
| 2012/0015189 A1 | 1/2012 | Suenaga et al. |
| 2015/0371744 A1* | 12/2015 | Yamoto ........... C08K 3/22 252/62.54 |

FOREIGN PATENT DOCUMENTS

| | | |
|---|---|---|
| JP | 60-14405 A | 1/1985 |
| JP | 2003-183443 A | 7/2003 |
| JP | 2003-183518 A | 7/2003 |
| JP | 2006-225601 A | 8/2006 |
| JP | 2009-145067 A | 7/2009 |
| JP | 2010-263201 A | 11/2010 |
| JP | 5637338 B1 | 12/2014 |
| WO | WO 01/41162 A1 | 6/2001 |

OTHER PUBLICATIONS

International Search Report (PCT/ISA/210) dated Aug. 4, 2015, by the Japanese Patent Office as the International Searching Authority for International Application No. PCT/JP2015/064243.
Written Opinion (PCT/ISA/237) dated Aug. 4, 2015, by the Japanese Patent Office as the International Searching Authority for International Application No. PCT/JP2015/064243.

* cited by examiner

*Primary Examiner* — Howard Williams
(74) *Attorney, Agent, or Firm* — Buchanan, Ingersoll & Rooney PC

(57) ABSTRACT

Provided is a method for a magnetic encoder having a magnetic body comprised of a magnetic rubber molded article, comprising a mixing step of mixing and then kneading a nitrile rubber (A), a ferrite magnetic powder (B) and a vulcanizing agent (C) to provide a magnetic rubber composition; and a molding step of molding and vulcanizing the magnetic rubber composition in a mold to which a magnetic field is applied to provide the magnetic rubber molded article, wherein a content of the ferrite magnetic powder (B) is 700 to 1500 parts by mass based on 100 parts by mass of the nitrile rubber (A); and a compressed density of the ferrite magnetic powder (B) is 3.5 g/cm$^3$ or more. According to this method, a magnetic encoder having a magnetic body with high coercivity and residual magnetic flux density can be produced by vulcanizing a magnetic rubber composition having favorable moldability.

14 Claims, No Drawings

METHOD FOR MANUFACTURING MAGNETIC ENCODER

TECHNICAL FIELD

The present invention relates to a method for manufacturing a magnetic encoder having a magnetic body comprised of a magnetic rubber molded article produced by vulcanizing a magnetic rubber composition comprising a nitrile rubber and a ferrite magnetic powder.

BACKGROUND ART

A magnetic rubber molded article produced by vulcanizing a magnetic rubber composition containing a rubber and a magnetic power has been used in a variety of applications. In particular, one suitable application of a magnetic rubber molded article is a magnetic encoder, which is produced by magnetizing a magnetic rubber molded article. Depending on performance required to an article, various rubbers are used, and in consideration of balance among oil resistance, heat resistance and a price, a nitrile rubber is suitably used. As a magnetic powder, a ferrite magnetic powder, a rare-earth magnetic powder and the like are used in accordance to required performance, and in the light of a cost and durability, a ferrite magnetic powder is suitably used (for example, see Patent Reference Nos. 1 to 3).

For improving precision of various sensors using a magnetic encoder and reducing a size, it is strongly needed to improve magnetic properties of a magnetic rubber molded article. For this purpose, a large amount of magnetic powder is routinely added to improve magnetic properties, but an excessive amount leads to deterioration in moldability, so that there is limitation to increase of the amount added. It has been, therefore, needed to provide a magnetic rubber molded article whereby magnetic properties can be improved while ensuring moldability.

Patent Reference No. 4 has described an anisotropic bond magnet made of a ferrite powder in which a particle size distribution has a plurality of peaks, a compressed density (CD) is 3.5 g/cm$^3$ or more and a green compact has a coercivity (p-iHc) of 2100 Oe or more. Specifically, the reference has described that a composition containing the ferrite powder and 6-Nylon is injection-molded in a magnetic field to produce an anisotropic bond magnet. The reference has described that it allows for producing a high-magnetic bond magnet exhibiting excellent fillability and orientation while keeping coercivity.

The polyamide (6-Nylon) used in Patent Reference No. 4 is of low viscosity at a high temperature higher than its melting point, and can be injection-molded at high speed even when it contains a large amount of ferrite magnetic powder. Meanwhile, a magnetic rubber molded article is produced by kneading a highly viscous magnetic rubber composition at a low temperature for a long period followed by vulcanization. It has been, however, found that when a highly viscous magnetic rubber composition containing a large amount of ferrite magnetic powder for a long period, coercivity of a magnetic rubber molded article obtained after vulcanization is considerably reduced due to applying intense shear force to the ferrite magnetic powder contained for a long period. This is a problem specific for a magnetic rubber composition, which is not significant for injection molding of a polyamide-containing bond magnet as described in Patent Reference No. 4. It is, therefore, strongly needed to provide a method for manufacturing a magnetic rubber molded article with high coercivity.

PRIOR ART REFERENCES

Patent References

Patent Reference No. 1: JP 1985-14405A
Patent Reference No. 2: JP 2003-183443A
Patent Reference No. 3: JP 2006-225601A
Patent Reference No. 4: JP 2010-263201A

SUMMARY OF THE INVENTION

Problems to be Solved by the Invention

To solve the above problems, an objective of the present invention is to provide a method for manufacturing a magnetic encoder having a magnetic body with high coercivity and residual magnetic flux density by vulcanizing a magnetic rubber composition having favorable moldability.

Means for Solving the Problems

The above problems are solved by providing a method for a magnetic encoder having a magnetic body comprised of a magnetic rubber molded article, comprising
a mixing step of mixing and then kneading a nitrile rubber (A), a ferrite magnetic powder (B) and a vulcanizing agent (C) to provide a magnetic rubber composition; and
a molding step of molding and vulcanizing the magnetic rubber composition in a mold to which a magnetic field is applied to provide the magnetic rubber molded article,
wherein a content of the ferrite magnetic powder (B) is 700 to 1500 parts by mass based on 100 parts by mass of the nitrile rubber (A); and
a compressed density of the ferrite magnetic powder (B) is 3.5 g/cm$^3$ or more.

Here, it is preferable that the ferrite magnetic powder (B) has a particle size distribution with a plurality of peaks. It is also preferable that the ferrite magnetic powder (B) is an anisotropic magnetic powder.

It is preferable that a minimum torque ML of the magnetic rubber composition is 3 to 8 kgf·cm as determined in a vulcanization curve at 180° C. It is also preferable that in the mixing step, the nitrile rubber (A), the ferrite magnetic powder (B) and the vulcanizing agent (C) are mixed and then kneaded at 60 to 130° C. for 10 to 60 min to provide the magnetic rubber composition. Furthermore, it is also preferable that vulcanization is conducted at 140 to 250° C. for 1 to 30 min in the mold to which a magnetic field is applied.

It is preferable that the encoder produced comprises a supporting member attachable to a rotator and an annular magnetic rubber molded article mounted on the supporting member, in which the magnetic rubber molded article is circumferentially alternately magnetized in N-pole and S-pole.

Effects of the Invention

According to the manufacturing method of the present invention, a magnetic encoder having a magnetic body with high coercivity and residual magnetic flux density can be produced by vulcanizing a magnetic rubber composition having favorable moldability. A high-performance magnetic encoder produced by the method of the present invention can contribute to improvement in precision and size reduction of various sensors employing the encoder.

Modes for Carrying out the Invention

A magnetic encoder according to the present invention has a magnetic body comprised of a magnetic rubber molded article. The magnetic rubber molded article is produced by vulcanizing a magnetic rubber composition containing a nitrile rubber (A) and a ferrite magnetic powder (B). Here, a content of the ferrite magnetic powder (B) is 700 to 1500 parts by mass based on 100 parts by mass of the nitrile rubber (A); and a compressed density of the ferrite magnetic powder (B) is 3.5 g/cm$^3$ or more. As described above, a magnetic rubber composition used in the present invention is characterized in that it contains a magnetic powder with a high compressed density at a high concentration.

It is known that a residual magnetic flux density of a magnetized magnetic rubber molded article can be increased by adding a large amount of magnetic powder. Thus, for various types of magnetic powders, we have molded and vulcanized a magnetic rubber composition containing a large amount of the magnetic powder based on a nitrile rubber in a mold to which a magnetic field is applied to give a magnetic rubber molded article, for which magnetic properties are determined. As a result, it has been found that the use of a magnetic powder with a higher compressed density allows for providing a magnetic rubber composition with favorable moldability even containing a magnetic powder at a high concentration, and for providing a magnetic rubber molded article with high coercivity although a highly viscous magnetic rubber composition is kneaded for a long period. Furthermore, by molding and vulcanizing the composition in a mold to which a magnetic field is applied, a residual magnetic flux density of the magnetic rubber molded article is increased. A magnetic rubber molded article with a high residual magnetic flux density and high coercivity is needed for a high-performance magnetic encoder.

A magnetic rubber composition of the present invention contains a nitrile rubber (A). There are no particular restrictions to a nitrile rubber (A) used in the present invention, and a copolymer of acrylonitrile and 1,3-butadiene can be used. Hydrogenation of double bonds remaining in 1,3-butadiene units after polymerization is optional. Non-hydrogenated rubbers (NBR) and hydrogenated rubbers (HNBR) can be used in accordance to an application. As long as the effects of the present invention are not impaired, the rubber can contain a structural unit derived from another copolymerizable monomer. Such a structural unit can contain functional groups such as carboxyl groups and carboxylic anhydride groups.

A content of acrylonitrile units in a nitrile rubber (A) is preferably 15 to 50% by mass. A content of 1,3-butadiene units is preferably 50 to 85% by mass including hydrogenated units. A nitrile rubber (A) can be non-hydrogenated (NBR) or hydrogenated (HNBR). A Mooney viscosity (ML$_{1+10}$, 100° C.) of a nitrile rubber (A) is preferably 20 to 100. For maintaining moldability even containing a large amount of magnetic powder, a lower Mooney viscosity is preferable, and it is thus more preferably 70 or less, further preferably 55 or less. Although a nitrile rubber which is liquid at room temperature (25° C.) can be combined, it is preferable to use a nitrile rubber which is solid at room temperature alone, in the light of operability.

A magnetic rubber composition of the present invention contains a ferrite magnetic powder (B). There are no particular restrictions to a ferrite magnetic powder (B), and a strontium ferrite magnetic powder and a barium ferrite magnetic powder can be suitably used. A ferrite magnetic powder (B) of the present invention must have a compressed density of 3.5 g/cm$^3$ or more, preferably 3.55 g/cm$^3$ or more. Thus, a magnetic rubber molded article with favorable moldability and magnetic properties can be provided. A compressed density is generally 4 g/cm$^3$ or less. Here, a compressed density (g/cm$^3$) of the ferrite magnetic powder (B) is a density of a sample prepared by charging 10 g of a ferrite magnetic powder in a cylindrical mold with an inner diameter of 2.54 cm and compressing it at a pressure of 1 ton/cm$^2$. For the purpose of such a compressed density, preferably a particle size distribution has a plurality of peaks. A particle size distribution of the ferrite magnetic powder (B) can be determined using a dry laser diffraction particle size distribution measuring device. An average particle diameter of the ferrite magnetic powder (B) is preferably 0.5 to 2 µm. Furthermore, the ferrite magnetic powder (B) is preferably an anisotropic magnetic powder. An anisotropic magnetic powder can be vulcanized in a mold to which a magnetic field is applied, to provide a magnetic rubber molded article with favorable magnetic properties. In general, an anisotropic magnetic powder suitable for such a vulcanizing method is commercially available as a magnetic powder "for magnetic field orientation". A magnetic powder for magnetic field orientation has a small aspect ratio ((diameter/thickness) ratio in a plate-like body) for allowing for easy rotation in a rubber composition under a magnetic field. Meanwhile, for a method for orientating in association with mechanical distortion without applying a magnetic field, a magnetic powder with a large aspect ratio commercially available as a magnetic powder "for mechanical orientation" is generally used.

In a magnetic rubber composition of the present invention, a content of a ferrite magnetic powder (B) based on 100 parts by mass of a nitrile rubber (A) is 700 to 1500 parts by mass. If a content of the ferrite magnetic powder (B) is less than 700 parts by mass, problems of deterioration in moldability and lower coercivity are not caused with a common ferrite magnetic powder and therefore, applying the present invention is less significant. A content of the ferrite magnetic powder (B) is suitably 850 parts by mass or more, more suitably 1000 parts by mass or more.

A magnetic rubber composition of the present invention can contain a rubber other than a nitrile rubber as long as it does not impair the effects of the present invention. However, a content of the other rubber is generally 10% by mass or less, preferably 5% by mass or less based on the total amount of the rubber component, and more preferably, a rubber other than a nitrile rubber is substantially absent. Furthermore, a magnetic rubber composition of the present invention can contain a magnetic powder other than a ferrite magnetic powder, such as a rare earth magnetic powder as long as it does not impair the effects of the present invention. However, its content is generally 10% by mass or less, preferably 5% by mass or less based on the total amount of the magnetic powder, and more preferably, a magnetic powder other than a ferrite magnetic powder is substantially absent.

A magnetic rubber composition of the present invention contains a vulcanizing agent (C). The vulcanizing agent (C) can be selected from those commonly used for vulcanizing a nitrile rubber (A), such as sulfur, a peroxide and a polyamine compound. A content of the vulcanizing agent (C) is generally 0.1 to 10 parts by mass based on 100 parts by mass of the nitrile rubber (A).

A magnetic rubber composition of the present invention can contain a component other than a nitrile rubber (A), a ferrite magnetic powder (B) and a vulcanizing agent (C) as long as it does not impair the effects of the present invention. The composition can contain various additives such as a vulcanization promoter, a vulcanization aid, an acid acceptor, a colorant, a filler and a plasticizer, which are commonly used for a magnetic rubber composition.

A method for manufacturing a magnetic encoder of the present invention comprises a mixing step of mixing and then kneading a nitrile rubber (A), a ferrite magnetic powder (B) and a vulcanizing agent (C) to provide a magnetic rubber composition; and a molding step of molding and vulcanizing the magnetic rubber composition in a mold to which a magnetic field is applied to provide the magnetic rubber molded article.

In the above mixing step, the individual components are mixed to provide a magnetic rubber composition. There are no particular restrictions to a mixing method and kneading can be conducted using an open roll, a kneader, a Banbury mixer, an Inter mixer, an extruder or the like. Among others, kneading is preferably conducted using an open roll or kneader. A temperature of the magnetic rubber composition during kneading is preferably 60 to 130° C. A kneading time is preferably 10 to 60 min.

As described above, for manufacturing a rubber molded article, it is common to knead a highly viscous composition at a relatively lower temperature for a relatively longer period followed by vulcanization. It has been, however, found that when a highly viscous magnetic rubber composition containing a large amount of ferrite magnetic powder is kneaded for a long time, strong shear force is applied to the ferrite magnetic powder for a long time, leading to deterioration in coercivity of a magnetic rubber molded article produced. Here, it has been found that the use of a ferrite magnetic powder (B) with a compressed density of 3.5 g/cm$^3$ or more can reduce the problem. This is a problem specific for a magnetic rubber composition, which is not observed in manufacturing a polyamide-containing bond magnet by injection molding.

A minimum torque ML of the magnetic rubber composition thus obtained is preferably 3 to 8 kgf·cm as determined in a vulcanization curve at 180° C. If an ML is less than 3 kgf·cm, air may remain in a molded article. If an ML is more than 8 kgf·cm, moldability may be insufficient, leading to insufficient filling.

The subsequent step is a molding step of molding and vulcanizing the magnetic rubber composition in a mold to which a magnetic field is applied to provide the magnetic rubber molded article. In the molding step, generally, the above magnetic rubber composition is molded into a desired shape and then vulcanized by heating. Examples of a method for molding a magnetic rubber composition include extrusion molding and compression molding. In particular, compression molding is suitable. A vulcanization temperature is preferably 140 to 250° C. A vulcanization time is preferably 1 to 30 min. Depending on the shape or the dimension of the magnetic rubber molded article, the inside may not be sufficiently vulcanized while the surface being vulcanized, and thus the composition can be further heated for secondary vulcanization. A heating method for vulcanization can be a method common for vulcanizing a rubber such as compression heating, steam heating, oven heating and hot-air heating, and compression heating is suitable.

In a manufacturing method of the present invention, vulcanization is conducted in a mold to which a magnetic field is applied. Thus, a residual magnetic flux density of the magnetic rubber molded article can be increased. Here, in compression molding, it is suitable to apply a magnetic field in a direction perpendicular to the surface of the molded article.

A magnetic encoder produced by the method of the present invention has a magnetic body comprised of the magnetized magnetic rubber molded article thus obtained. Although the magnetic body can have one set of S- and N-poles, it is often a multipolar magnetic body in which magnetic poles are alternately arranged, but magnetization style is not limited to these. There are no particular restrictions to the shape of the magnetic body, but it is preferably annular such as a disk and a cylinder for detecting rotational movement. In such a case, S- and N-poles are circumferentially alternately arranged so that an angle can be detected. Thus, it is practically the most important aspect. In an application for detecting linear movement, a flat strip magnetic body can be used. When S- and N-poles are closely formed and a dimension of each pole is small, higher coercivity is required, and therefore, the use of a magnetic encoder produced by the method of the present invention is considerably beneficial.

A magnetic encoder produced by the method of the present invention has, if necessary, a supporting member which supports the magnetic body. The supporting member is preferably a metal member, particularly a metal plate. There are no particular restrictions to a method for bonding a magnetic rubber molded article and a supporting member, and these can be directly bonded during vulcanizing a magnetic rubber molded article. However, for bonding a magnetic rubber composition of the present invention more strongly to a supporting member, the magnetic rubber molded article and the supporting member are preferably bonded via a thermosetting adhesive. Here, the magnetic rubber composition can be molded and vulcanized, and then the thermosetting adhesive can be cured to bond the magnetic rubber molded article to the supporting member via the thermosetting adhesive. Alternatively, the magnetic rubber composition can be molded and vulcanized while the thermosetting adhesive is cured to bond the magnetic rubber molded article to the supporting member via the thermosetting adhesive. The thermosetting adhesive used can be any adhesive which can be cured by allowing a crosslinking reaction to proceed by heating. Examples of adhesives which can be used include a phenol resin, an epoxy resin, an urethane resin, a rubber cement prepared by dissolving an unvulcanized rubber in a solvent and a silane coupling agent.

A suitable embodiment of a magnetic encoder produced by the method of the present invention is a magnetic encoder comprising a supporting member attachable to a rotator and an annular magnetic rubber molded article mounted on the supporting member, in which the magnetic rubber molded article is circumferentially alternately magnetized in N-pole and S-pole. This is useful as a magnetic encoder for detecting rotational movement. When a small angle is precisely measured, the use of a magnetic encoder having a magnetic rubber molded article with high coercivity is considerably beneficial.

There are no particular restrictions to an application of a magnetic encoder produced by the method of the present invention. A magnetic encoder having an annular or disk multipolar magnetic body in which magnetic poles are circumferentially alternately arranged is used in a sensor for detecting rotational movement. For example, it can be used in an axle rotation speed sensor, a crank angle sensor, a motor rotation angle sensor and the like. A magnetic encoder having a multipolar magnetic body in which magnetic poles are alternately arranged in a linear direction is used in a sensor which detects linear movement. It is, for example, used in a linear guide device, a power window, a power seat, a break step-in amount sensor, an office machine and the like. Among these, the use as a magnetic encoder for a sensor rotor in an antilock brake system for an automobile is the most useful application of a magnetic encoder produced by the method of the present invention, which is excellent in flexibility and magnetic properties and has a high residual magnetic flux density and high coercivity.

EXAMPLES

Example 1

[Preparation of an Unvulcanized Rubber Sheet]

The starting materials below were kneaded using an open roll with a diameter of 8 inch while the composition was kept at 60 to 100° C. for 35 min, to prepare unvulcanized rubber sheets with a thickness of 1 mm, 1.5 mm and 2 mm.
  Nitrile rubber (unhydrogenated: NBR): 100 parts by mass
    Acrylonitrile content 34%, Moony viscosity ($ML_{1+10}$, 100° C.) 45
  Strontium ferrite magnetic powder A (for magnetic field orientation): 1100 parts by mass
  Average particle diameter: 1.2 μm (a particle size distribution has a plurality of peaks.)
  Compressed density: 3.6 g/cm$^3$
  Residual magnetic flux density of a compressed body: 196 mT
  Coercivity of a compressed body: 236 kA/m
  Plasticizer TOTM [tris(2-ethylhexyl) trimellitate]: 3 parts by mass
  Zinc oxide: 4 parts by mass
  Stearic acid: 3 parts by mass
  Anti-aging agent: [4,4'-bis(α,α-dimethylbenzyl)diphenylamine]: 5 parts by mass
  Solid paraffin: 2 parts by mass
  Sulfur: 0.4 parts by mass
  Vulcanization accelerator MBTS (2,2'-dibenzothiazolyl disulfide):2 parts by mass
  Vulcanization accelerator TETD (tetraethylthiuram disulfide): 1.5 parts by mass

[Vulcanization Properties]

The unvulcanized rubber sheet obtained as a sample was measured for vulcanization properties using "Curelastometer 7" from A&D Company, Limited in accordance with JIS K6300-2. A vulcanization curve was formed at a measurement temperature of 180° C. for 5 min, and from a graph in which a vertical axis is torque and a horizontal axis is time, a minimum torque ML (kgf·cm), a maximum MH (kgf·cm), a time to 10% torque of MH t10 (min) and a time to 90% torque of MH t90 (min) were determined.

[Mechanical Properties]

A tensile test was conducted in accordance with JIS K6251. The unvulcanized rubber sheet obtained was press-vulcanized at 170° C. for 10 min to give a vulcanized rubber sheet with a thickness of 1 mm. A tensile strength (MPa) and an elongation (%) were determined at 23° C. and a relative humidity of 50% and at a tension rate of 500 mm/min, using a Dumbbell No.3 type test piece prepared by cutting the vulcanized rubber sheet obtained. As a result, a tensile strength was 4.0 MPa and an elongation was 30%.

[Hardness]

Hardness was determined in accordance with JIS K6253. A test piece prepared by laminating three vulcanized rubber sheets with a thickness of 2 mm as prepared for the tensile test was measured for hardness at a temperature of 23° C. and a relative humidity of 50% using a type A durometer to read a peak value. As a result, an A-hardness was 90.

[Magnetic Properties]

From the unvulcanized rubber sheet obtained, a disk test piece with a diameter of 18 mm and a thickness of 6 mm was prepared and then press-vulcanized at 170° C. for 10 min under a magnetic field in a direction of test-piece thickness, to prepare a vulcanized rubber test piece. The molded article obtained was measured for a residual magnetic flux density and a coercivity using a direct-current magnetization property testing device "BH curve tracer" from METRON Inc. As a result, a residual magnetic flux density was 300 mT and a coercivity was 270 kA/m.

[Adhesiveness to a Supporting Member]

An SUS430 annular supporting member (slinger) with a plate thickness of 0.6 mm and an L-shaped cross-section was used. The supporting member had a dimension; an inner diameter of an inner cylinder: 55 mm, an outer diameter of an outer circular-ring: 67 mm, and an axial length of the inner cylinder: 4.0 mm. Separately, an unvulcanized rubber sheet obtained with a thickness of 1.5 mm was cut into a toroidal sheet with an inner diameter of 56 mm and an outer diameter of 67 mm, which was then placed on the supporting member precoated with an adhesive made of a phenol resin. Subsequently, it was press-vulcanized at 180° C. for 3 min, to form a magnetic body with an inner diameter of 56 mm, an outer diameter of 67 mm and a thickness of 1.0 mm. The magnetic body was firmly bonded to the supporting member and adhesiveness was good. The above results are summarized in Table 1.

Example 2

An unvulcanized rubber sheet was produced as described in Example 1, substituting a strontium ferrite magnetic powder B for a strontium ferrite magnetic powder A. The properties of the strontium ferrite magnetic powder B are as follows. Using the unvulcanized rubber sheet obtained, vulcanization properties, magnetic properties and adhesiveness to a supporting member were measured as described in Example 1. The results are summarized in Table 1.
  Average particle diameter: 1.14 μm (a particle size distribution has one peak.)
  Compressed density: 3.5 g/cm$^3$
  Residual magnetic flux density of a compressed body: 185 mT
  Coercivity of a compressed body: 273 kA/m Example 3

An unvulcanized rubber sheet was produced as described in Example 1, except that a hydrogenated nitrile rubber (HNBR) was substituted for a nitrile rubber (NBR), and the added amount of stearic acid was 2 parts by mass and the added amount of sulfur was 0.5 parts by mass. The properties of the hydrogenated nitrile rubber used herein are as described below. Using the unvulcanized rubber sheet obtained, vulcanization properties, magnetic properties and adhesiveness to a supporting member were measured as described in Example 1. The results are summarized in Table 1.
  Acrylonitrile content: 36%
  Moony viscosity ($ML_{1+10}$, 100° C.): 57
  iodine value: 28 g/100 g Comparative Example 1

An unvulcanized rubber sheet was produced as described in Example 1, substituting a strontium ferrite magnetic powder C (for magnetic field orientation) for a strontium ferrite magnetic powder A. The properties of the strontium ferrite magnetic powder C are as described below. Using the unvulcanized rubber sheet obtained, vulcanization properties, magnetic properties and adhesiveness to a supporting member were measured as described in Example 1. The results are summarized in Table 1.

Average particle diameter: 1.4 μm (a particle size distribution has one peak.)
Compressed density: 3.4 g/cm$^3$
Residual magnetic flux density of a compressed body: 185 mT
Coercivity of a compressed body: 207 kA/m Comparative Example 2

An unvulcanized rubber sheet was produced as described in Example 1, except that a strontium ferrite magnetic powder D (for mechanical orientation) was substituted for a strontium ferrite magnetic powder A, and vulcanization was conducted without applying a magnetic field. The properties of the strontium ferrite magnetic powder D are as described below. Using the unvulcanized rubber sheet obtained, vulcanization properties, magnetic properties and adhesiveness to a supporting member were measured as described in Example 1. The results are summarized in Table 1.

Average particle diameter: 1.1 μm (a particle size distribution has one peak.)
Compressed density: 3.2 g/cm$^3$
Residual magnetic flux density of a compressed body: 193 mT
Coercivity of a compressed body: 235 kA/m low and fluidity is significantly improved. In contrast, in the magnetic body of Comparative Example 1 where a magnetic powder with a compressed density of less than 3.5 g/cm$^3$ was vulcanized under a magnetic field, a coercivity was reduced by shear force during kneading. In the magnetic body of Comparative Example 2 with mechanical orientation without applying a magnetic field during press vulcanization, the magnetic powder was insufficiently orientated, and thus a residual magnetic flux density was reduced.

The invention claimed is:

1. A method for manufacturing a magnetic encoder having a magnetic body comprised of a magnetic rubber molded article, comprising
    a mixing step of mixing and then kneading a nitrile rubber (A), a ferrite magnetic powder (B) and a vulcanizing agent (C) to provide a magnetic rubber composition; and
    a molding step of molding and vulcanizing the magnetic rubber composition in a mold to which a magnetic field is applied to provide the magnetic rubber molded article,
    wherein a content of the ferrite magnetic powder (B) is 700 to 1500 parts by mass based on 100 parts by mass of the nitrile rubber (A);
    a compressed density of the ferrite magnetic powder (B) is 3.5 g/cm$^3$ or more; and
    a minimum torque ML of the magnetic rubber composition is 3 to 8 kgf·cm as determined in a vulcanization curve at 180° C.

2. The method for manufacturing a magnetic encoder as claimed in claim 1, wherein the ferrite magnetic powder (B) has a particle size distribution with a plurality of peaks.

TABLE 1

| | | Example 1 | Example 2 | Example 3 | Comparative Example 1 | Comparative Example 2 |
|---|---|---|---|---|---|---|
| Composition | NBR | 100 | 100 | — | 100 | 100 |
| | HNBR | — | — | 100 | — | — |
| | Ferrite A (3.6 g/cm$^3$) | 1100 | — | 1100 | — | — |
| | Ferrite B (3.5 g/cm$^3$) | — | 1100 | — | — | — |
| | Ferrite C (3.4 g/cm$^3$) | — | — | — | 1100 | — |
| | Ferrite D (3.2 g/cm$^3$) | — | — | — | — | 1100 |
| | Plasticizer TOTM | 3 | 3 | 3 | 3 | 3 |
| | Zinc oxide | 4 | 4 | 4 | 4 | 4 |
| | Stearic acid | 3 | 3 | 2 | 3 | 3 |
| | Anti-agent agent | 5 | 5 | 5 | 5 | 5 |
| | Solid paraffin | 2 | 2 | 2 | 2 | 2 |
| | Sulfur | 0.4 | 0.4 | 0.5 | 0.4 | 0.4 |
| | Vulcanization accelerator MBTS | 2 | 2 | 2 | 2 | 2 |
| | Vulcanization accelerator TETD | 1.5 | 1.5 | 2 | 1.5 | 1.5 |
| Vulcanization curve | T10 [min] | 1.13 | 1.25 | 1.40 | 0.88 | 0.90 |
| | T90 [min] | 2.52 | 3.01 | 2.91 | 2.40 | 3.29 |
| | ML [kgf · cm] | 5.28 | 8.02 | 6.51 | 9.13 | 10.40 |
| | MH [kgf · cm] | 37.89 | 60.10 | 22.32 | 47.53 | 81.20 |
| Residual magnetic flux density [mT] | | 300 | 290 | 298 | 292 | 260 |
| Coercivity [kA/m] | | 270 | 273 | 260 | 229 | 280 |
| Adhesiveness to a supporting member | | Good | Good | Good | Good | Good |

As seen in Table 1, in Examples 1 to 3 where a magnetic powder with a compressed density of 3.5 g/cm$^3$ or more was vulcanized under a magnetic field, a magnetic body with a high residual magnetic flux density, and a high coercivity was obtained. Furthermore, in Examples 1 to 3, an ML value in a vulcanization curve was small and fluidity during molding was favorable. In particular, it can be seen that in Example 1 where a particle size distribution of the magnetic powder had a plurality of peaks, an ML value is particularly 3. The method for manufacturing a magnetic encoder as claimed in claim 2, wherein the ferrite magnetic powder (B) is an anisotropic magnetic powder.

4. The method for manufacturing a magnetic encoder as claimed in claim 1, wherein the ferrite magnetic powder (B) is an anisotropic magnetic powder.

5. The method for manufacturing a magnetic encoder as claimed in claim 1, wherein in the mixing step, the nitrile rubber (A), the ferrite magnetic powder (B) and the vulcanizing agent (C) are mixed and then kneaded at 60 to 130° C. for 10 to 60 min to provide the magnetic rubber composition.

6. The method for manufacturing a magnetic encoder as claimed in claim 1, wherein vulcanization is conducted at 140 to 250° C. for 1 to 30 min in the mold to which a magnetic field is applied.

7. The method for manufacturing a magnetic encoder as claimed in claim 1, wherein the magnetic encoder comprises a supporting member attachable to a rotator and an annular magnetic rubber molded article mounted on the supporting member, in which the magnetic rubber molded article is circumferentially alternately magnetized in N-pole and S-pole.

8. A magnetic encoder having a magnetic body comprised of a magnetic rubber molded article, wherein
the magnetic rubber molded article is obtained by vulcanizing a magnetic rubber composition comprising a nitrile rubber (A) and a ferrite magnetic powder (B),
a content of the ferrite magnetic powder (B) is 700 to 1500 parts by mass based on 100 parts by mass of the nitrile rubber (A),
a compressed density of the ferrite magnetic powder (B) is 3.5 g/cm$^3$ or more,
an average particle diameter of the ferrite magnetic powder (B) is 0.5 to 2 μm,
the ferrite magnetic powder (B) has a particle size distribution with a plurality of peaks, and
a minimum torque ML of the magnetic rubber composition is 3 to 8 kgf·cm as determined in a vulcanization curve at 180° C.

9. The magnetic encoder as claimed in claim 8, wherein the ferrite magnetic powder (B) is an anisotropic magnetic powder.

10. The magnetic encoder as claimed in claim 8, comprising a supporting member attachable to a rotator and an annular magnetic rubber molded article mounted on the supporting member, in which the magnetic rubber molded article is circumferentially alternately magnetized in N-pole and S-pole.

11. A method for manufacturing the magnetic encoder as claimed in claim 8, comprising
a mixing step of mixing and then kneading the nitrile rubber (A), the ferrite magnetic powder (B) and a vulcanizing agent (C) to provide the magnetic rubber composition; and
a molding step of molding and vulcanizing the magnetic rubber composition to provide the magnetic rubber molded article.

12. The method for manufacturing the magnetic encoder as claimed in claim 11, wherein in the mixing step, the nitrile rubber (A), the ferrite magnetic powder (B) and the vulcanizing agent (C) are mixed and then kneaded at 60 to 130° C. for 10 to 60 min to provide the magnetic rubber composition.

13. The method for manufacturing the magnetic encoder as claimed in claim 11, wherein in the molding step, the vulcanization is conducted at 140 to 250° C. for 1 to 30 min.

14. The method for manufacturing the magnetic encoder as claimed in claim 11, wherein in the molding step, the magnetic rubber composition is molded and vulcanized in a mold to which a magnetic field is applied.

* * * * *